(12) United States Patent
Bendapudi et al.

(10) Patent No.: US 11,363,112 B2
(45) Date of Patent: Jun. 14, 2022

(54) HIGH-DENSITY MULTI-TENANT DISTRIBUTED CACHE AS A SERVICE

(71) Applicant: Microsoft Technology Licensing, LLC, Redmond, WA (US)

(72) Inventors: Perraju Bendapudi, Hyderabad (IN); Hari Krishnan S., Hyderabad (IN); Jithendra K. Veeramachaneni, Hyderabad (IN); Jagan M. Peri, Hyderabad (IN); Jatin Kakkar, Hyderabad (IN); Amit Kumar Yadav, New Delhi (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 617 days.

(21) Appl. No.: 16/266,770

(22) Filed: Feb. 4, 2019

(65) Prior Publication Data

US 2019/0173976 A1 Jun. 6, 2019

Related U.S. Application Data

(63) Continuation of application No. 13/274,355, filed on Oct. 17, 2011, now Pat. No. 10,200,493.

(51) Int. Cl.
*H04L 67/568* (2022.01)
*G06F 21/33* (2013.01)
(Continued)

(52) U.S. Cl.
CPC ........ *H04L 67/2842* (2013.01); *G06F 21/335* (2013.01); *H04L 63/0807* (2013.01); *H04L 67/1002* (2013.01); *G06F 2212/314* (2013.01); *H04L 41/5096* (2013.01); *H04L 67/288* (2013.01)

(58) Field of Classification Search
CPC ............. H04L 67/2842; H04L 67/1002; H04L 63/0807; H04L 47/70; G06F 21/0886; G06F 21/335; G06F 3/0629–0632; G06F 3/0683–0689; G06F 2212/31–314; G06F 2212/45; G06F 9/455; G06F 17/3048
See application file for complete search history.

(56) References Cited

U.S. PATENT DOCUMENTS

| 8,533,161 | B2 * | 9/2013 | McDonald | G06F 16/182 707/783 |
| 8,565,422 | B2 * | 10/2013 | Lee | H04L 9/088 713/168 |
| 2010/0125612 | A1 * | 5/2010 | Amradkar | H04L 63/105 707/E17.014 |

FOREIGN PATENT DOCUMENTS

WO   WO-2013051056 A1 *  4/2013   ........... G06F 3/0604

* cited by examiner

*Primary Examiner* — Daniel B Potratz
(74) *Attorney, Agent, or Firm* — Ray Quinney & Nebeker P.C; James Bullough

(57) ABSTRACT

A multi-tenant, elastically scalable cache as a service is disclosed. Embodiments of the cache service eliminate the need for applications to manage their own cache tier. The multi-tenant cache service is implemented by maintaining/creating multiple named caches in a cache cluster and mapping each tenant's cache to a named cache in the cluster. Strict quotas are enforced on cache sizes This allows caches with different replication attributes to co-exist on the same cache server, allows migration of a cache from one cluster to another for load balancing purposes, and allows a cache to inflate/deflate to meet business needs. A network load balancer is used to route cache items to servers.

20 Claims, 4 Drawing Sheets

(51) Int. Cl.
*H04L 9/40* (2022.01)
*H04L 67/1001* (2022.01)
*H04L 41/50* (2022.01)
*H04L 67/288* (2022.01)

HIGH-DENSITY MULTI-TENANT DISTRIBUTED CACHE AS A SERVICE

This application is a continuation of U.S. patent application Ser. No. 13/274,355 filed on Oct. 17, 2011. The aforementioned application is expressly incorporated herein by reference in its entirety.

BACKGROUND

Traditionally, applications have used portions of local memory on a host server for data caching. With this type of hosted cache solution, only a part of the local memory may be used as the cache because that memory is also consumed by the operating system and other processes running on the server. A hosted caching solution can be difficult to use because the user is usually responsible for installation and configuration of the applications and cache in addition to ongoing management and maintenance of the system.

Additionally, with a hosted cache, the application scale is limited by the capacity of the compute instance hosting the cache. To scale-up the cache, the user must manually add and prepare additional instances. Additionally, there is no guaranteed uptime for the hosted cache. Instead, the user is responsible for maintaining the operating status of the cache.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In embodiments of the invention, cache is offered as a multi-tenant service in the cloud. Applications do not have to worry about deploying, managing, and scaling the cache clusters because this is all handled by the cache service. Multi-tenancy on the cache service offers significant economies of scale for the service.

Embodiments provide a multi-tenant, elastically scalable, distributed, and replicated cache as a service for applications running in the cloud. Applications that need a distributed cache can simply point to an assigned cache endpoint or URL in the cloud and start leveraging the performance and scale benefits of a distributed cache without worrying about deploying, managing, securing and scaling the cache tier.

The caching service embodiments disclosed herein provide a distributed, in-memory cache that accelerates the performance and scale of applications built on a cloud platform. The distributed, in-memory caching allows users to keep frequently-queried data in-memory and close to the application itself, thereby reducing overhead and eliminating unnecessary network latency.

The caching service can be used without code changes. Instead, simple configuration changes may be used to activate the distributed cache. The caching capabilities may also be directly available using a simple API for more flexible and customized application use.

The distributed cache is delivered as a true service and, therefore, has a very simple provisioning model that requires no infrastructure to install, set up or manage. Instead, the cache infrastructure is managed by the cache service itself. Users only need to configure two things: the data that will be stored and how large a cache is needed. As the needs of the application grow or decrease, users can dynamically change the size of the elastic cache based on their needs.

The caching service provides a Platform as a Service (PaaS) model in which the cost and complexity of installing, configuring, and managing the infrastructure is hidden from users. Using the distributed caching service, users are guaranteed a configured cache size at all times. Because the cache service handles all the installation and management details, users only have to use the service. The cache service is distributed, so it can scale with the application demand by the user simply requesting an increase in the memory size. As a distributed service, the uptime and availability of the cache service can be guaranteed to the user and the application.

Deployment of the cache service is a cache cluster listening behind a virtual IP (VIP) and client requests routing to the VIP. Multi-tenant provisioning is achieved by assigning multiple domain names to the same VIP.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
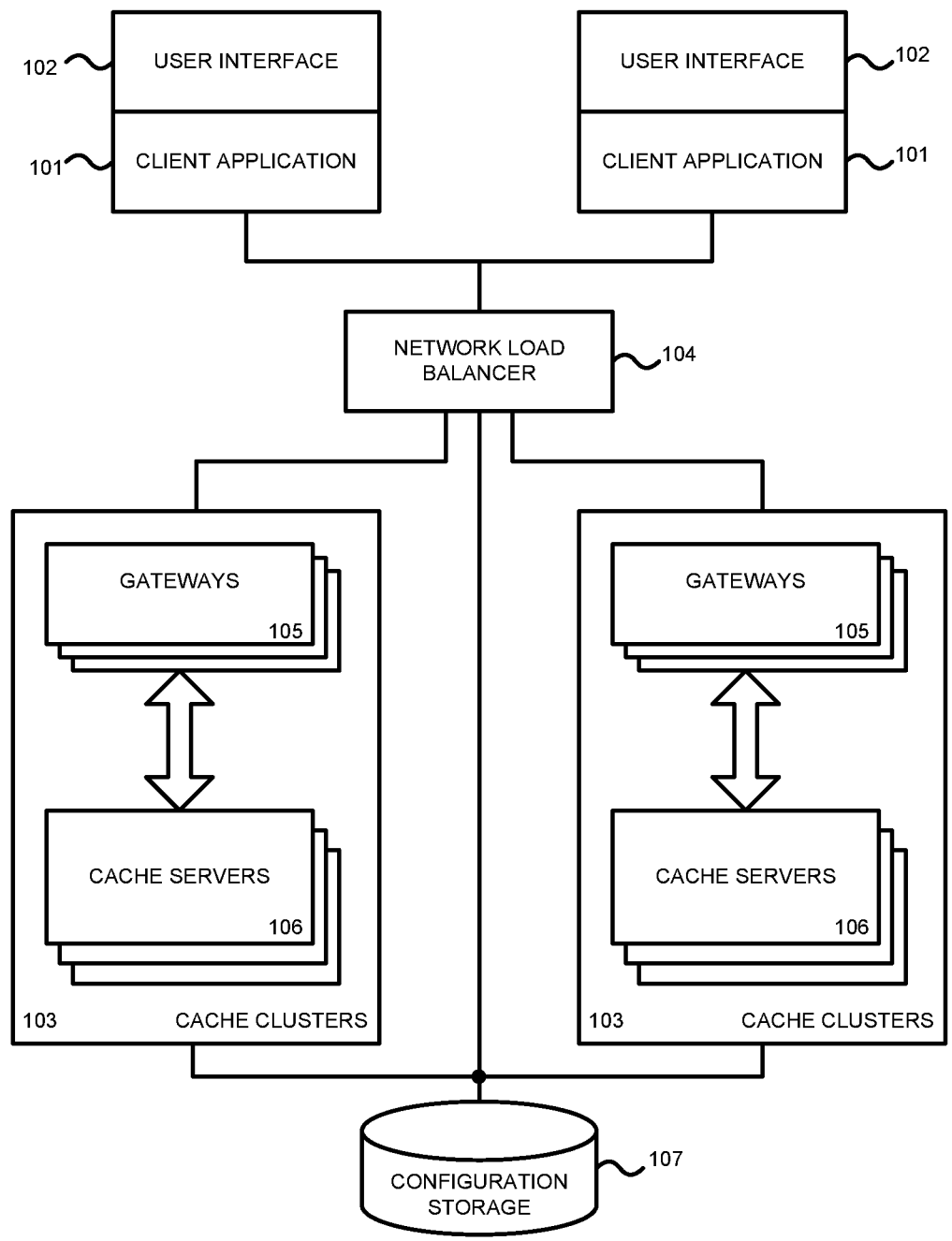
FIG. 1 is a block diagram illustrating the network topology for a distributed cache service according to one embodiment.

FIG. 1 is a block diagram illustrating the network topology for a distributed cache service according to one embodiment. Applications 101 are registered for and configured to use the cache service. Applications 101 may include a user interface 102 or other client-facing component. In one embodiment, the user interface 102 communicates with external users via the Internet. Application 101 may carry out some task asynchronously, such as processing business logic, writing data to storage, or carrying out a long-running computation. In one embodiment, application 101 may perform a worker role and user interface 102 may perform a web role in the WINDOWS AZURE™ architecture.

The cache service is provided using a plurality of cache clusters 103 that may be distributed across multiple locations and multiple physical and/or virtual machines. Network load balancer 104 provides load balancing across the cache service. Cache clusters 103 comprise a ring of gateway nodes 105 and a ring of cache servers 106. A configuration store 107 maintains tenant information, provisioning data, and other information required to run the cache clusters 103.

Gateway nodes 105 are front-end servers that perform basic authentication. Gateway nodes 105 route requests to back-end cache servers 106. In one embodiment, the gateway nodes 105 listens at a public port, which may be load balanced behind a virtual IP (VIP) on network load balancer 104. Requests from a client application 101 may land on any of the gateway nodes 105.

For example, when a user requests a cache with name "xyz," the user is provided with a domain name such as "xyz.cache.cloudapp.net." The domain "xyz.cache.cloudapp.net" maps to the VIP of a cache cluster 103 in a given datacenter. When a second user asks for cache with the name "abc," a domain name "abc.cache.cloudapp.net" is created and maps to the same VIP as the "xyz" domain. In this way, multi-tenant provisioning is achieved by mapping multiple domain names to the same VIP of a cache cluster 103.

Request Routing.

A client application 101 connects to the provisioned domain name "xyz.cache.cloudapp.net" on a TCP channel on an assigned port number over which gateway server is listening. Client application 101 may be a simple client without any routing table information. When client application 101 makes request to the provisioned domain name, network load balancer 104 routes the request to any one of the gateway nodes 105. Using key information in the client request, one or more of the gateway nodes 105 knows which cache server 106 contains the requested data. The gateway node 105 routes the request to the cache server 106 having the actual data. The gateway node then receives the data from cache server 106 and sends the response back the client application 101.

Cache servers 106 may communicate with each other over an internal port that is visible only to gateway nodes 105 and the other cache servers 106 on the same ring. The cache server 106 and the gateway nodes 105 form a single tenant. The number of nodes in a gateway/cache server cluster 103 determines the size of a scale unit and the number of users that can be provisioned to a scale unit.

Multi-Tenancy.

Multiple users' content may be saved in the same cache cluster 103. Isolation of data can be done in two ways: scope the key, region with a user application ID in the same cache cluster 103, or use one cache server 106 per user in the same cache cluster 103. The user's data may be partitioned and fragments of the data saved in individual cache servers.

Approach 1: Scope the key, region with the user application ID in the same cache. In this approach the key, region, and application ID form a unique way to access an item in the cache. There is a default cache in the cache cluster 103 indexed by the cache item and the application ID field is used to differentiate items stored by two different users.

Advantages to this approach include, for example, the use of a single cache with fixed partitions is easy to manage, and there is low overhead as each new named cache creates notification and queue overheads for scope.

Disadvantages to this approach include, for example, an isolation boundary that is not very clean so that containers such as a notification queue, write-behind queue, etc. have to be bound by the scope ID. Throttling, eviction, etc. have to take care of the scope ID to have a fair algorithm across different users in the tenant. Also, performance counters and statistics per user per host are not easy to maintain.

Approach 2: use one cache per user in the same cache cluster. In this approach, there is one name cache created per provisioned user in the cache cluster. There is a mapping from the user DNS to the named cache in the cluster.

Advantages of this approach include, for example, a clean isolation boundary with cache per user, settings such as notification, write-behind, etc. can be per user, and throttling and quota management can be done per cache.

Disadvantages of this approach include, for example, high overhead when creating one named cache per user, high overhead to track partitions across named caches, and the lifecycle of a named cache based on user provisioning or removal is difficult to maintain.

Multi-tenancy should ensure that algorithms for quota, eviction, etc. are fair per user. Additionally, the authentication process should make sure one user is never able to access or get any information about another user's data.

Policy Management.

Policies, such as throttling user requests and global throttling, that keep the cluster in good shape are handled in the gateway node 105. The gateway node 105 also takes care of quota management and metering of user requests as required.

Security.

The caching service needs to ensure that a tenant's application can perform operations only against its own cache and that no other tenant can access this cache. In one embodiment, an access control service can be used to perform authentication/authorization. The flow for authentication using such a service would be as follows.

User Provisioning of Cache.

When a cache is provisioned for a user, an access control service endpoint for the cache is automatically provisioned. A management key is provided for the user to use to configure the access control service endpoint. A shared key is provided that can be used by the client application 101 to get a ticket to access the cache service. The gateway node 105 has a private version of the shared key that can be used to decrypt user data. The access control service endpoint and the shared key are provided to the user once the cache provisioning is done. This information may be passed in as input parameters to the client application 101.

Authentication/Authorization.

The gateway node 105 manages authentication of user requests. In one embodiment, client application 101 goes through the following steps to access content in the cache 106. Client application 101 accesses a provisioned endpoint and passes the shared key. The access control service returns a ticket to the client application 101 with the required authentication/authorization details. The client application 101 caches the ticket and sends the ticket data to a gateway node 105 via the network load balancer 104 on TCP channel creation. The gateway node 105 validates the ticket and allows the connection to be established to the cache cluster 103. The authentication/authorization ticket does not need to be passed in the subsequent requests.

The expiry time for the authentication/authorization ticket is set to a high value, such as twenty-four hours or more, in one embodiment. On ticket expiry or if an unauthorized ticket is presented, the gateway node 105 responds with an unauthorized-request error. The client application 101 may then re-fetch the ticket and make an updated request to the gateway node 105.

Configuration Store.

Configuration information for the cache cluster 103 can be saved in configuration storage 107.

In one embodiment, a SQL AZURE™ table store can be used as an external store provider to keep the cache cluster information. In another embodiment, configuration information for WINDOWS AZURE™ can be used to pass the shared configuration information. The cluster configuration information is available on each node. The dynamic configuration information is pushed using the WINDOWS AZURE™ configuration change infrastructure. This approach removes external dependency on SQL AZURE™.

The cache service is optimized to keep latency as low as possible by reducing the number of hops required before a request reaches the location where data is stored. Gateway 105 maintains a table that tracks the location of data in the ring of cache servers 106. Gateway 105 retrieves the data requested by the user from the appropriate cache server 106 and relays the data to the user. However, the routing is not permanent. If a cache server 106 goes down, the user data may be moved to a new cache server 106 and the data location updated in gateway 105. In one embodiment, partitions are formed in the cache servers 106 and the user's data is tied to a selected partition and the gateway node 105 tracks the partitions.

The concept of a multi-tenant, elastically scalable cache as a service that eliminates the need for apps to manager their cache tier The system illustrated in FIG. 1 implements multi-tenancy by maintaining/creating multiple named caches in the cache cluster and mapping a tenant's cache to a named cache in the cluster. This approach allows enforcement of strict quotas on cache sizes. Additionally, this configuration allows caches with different replication attributes (e.g. no replication, replicated, etc.) to co-exist on the same cache server. A cache may be migrated from one cluster to another for load balancing purposes. Additionally, a cache may be scaled up or down to meet business needs.

A user's cache is dynamically allocated to a cache cluster during provisioning. When a user requests a cache, as part of provisioning, the cache service decides where this cache can be located, such as which cache servers 106 the cache data will be spread across.

Multi-tenancy is supported by ensuring each tenant gets a unique named cache for that tenant. Access to that cache is protected using security tokens that are issued by an access control service and enforced at the gateway. The named cache is configured with properties selected by the tenant during provisioning, such as cache size, replication properties, access control keys/tokens, etc. Partitions associated with this cache are distributed across a set of servers in the cache cluster to achieve partitioned/replicated caches.

In typical cloud deployments, servers sit behind a network load balancer and applications cannot directly access the individual servers. This causes a problem when offering a large-scale partitioned cache to applications because the requests to look up items need to be routed to the server that is responsible for that data item. In embodiments of the invention, a farm of proxy servers or gateways accept requests from applications, determine the back-end servers responsible for the items, and forward the request to/response from the back-end servers.

Figure 2:
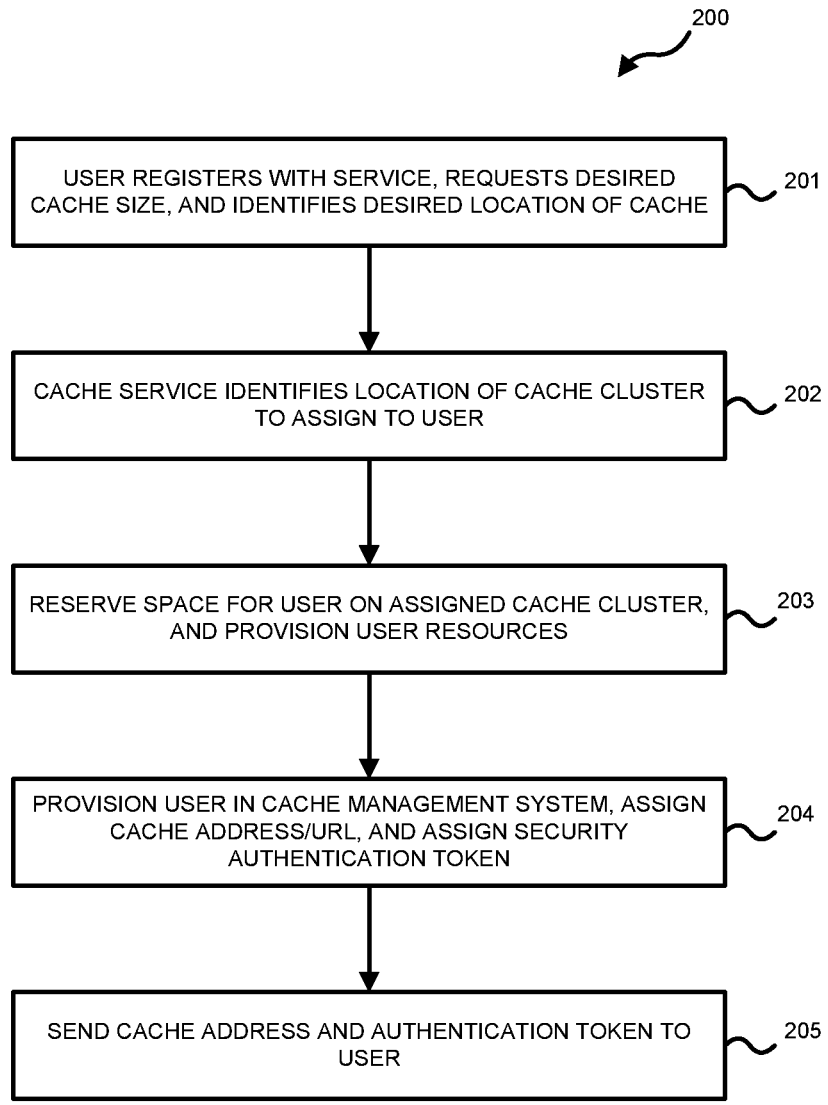
FIG. 2 is a flowchart that illustrates a process for provisioning users on the cache service according to one embodiment.

FIG. 2 is a flowchart 200 that illustrates a process for provisioning users on the cache service according to one embodiment. In step 201, a user registers with service. The user requests a desired cache size and identifies a desired location for the cache. In step 202, the cache service identifies the location of the cache cluster to host the user's cache. In one embodiment, the cache service comprises a plurality of cache clusters distributed in a number of different locations. Each cache cluster comprises a ring of cache servers. The cache service may select a cache cluster based upon the user's desired location and/or the user's desired cache size. Once a user is provisioned to an assigned cache server ring, the user has a presence only on that ring. The gateway node knows which ring is storing the data.

In step 203, the cache service reserves space for the user's cache on the assigned cache cluster, and provisions resources for the user's cache. In step 204, the cache service provisions the user in the cache management system, assigns a cache address or URL, and assigns security authentication token In step 205, the cache service sends the cache address and authentication token to the user. The user then configures the client application to use the cache endpoint.

Figure 3:
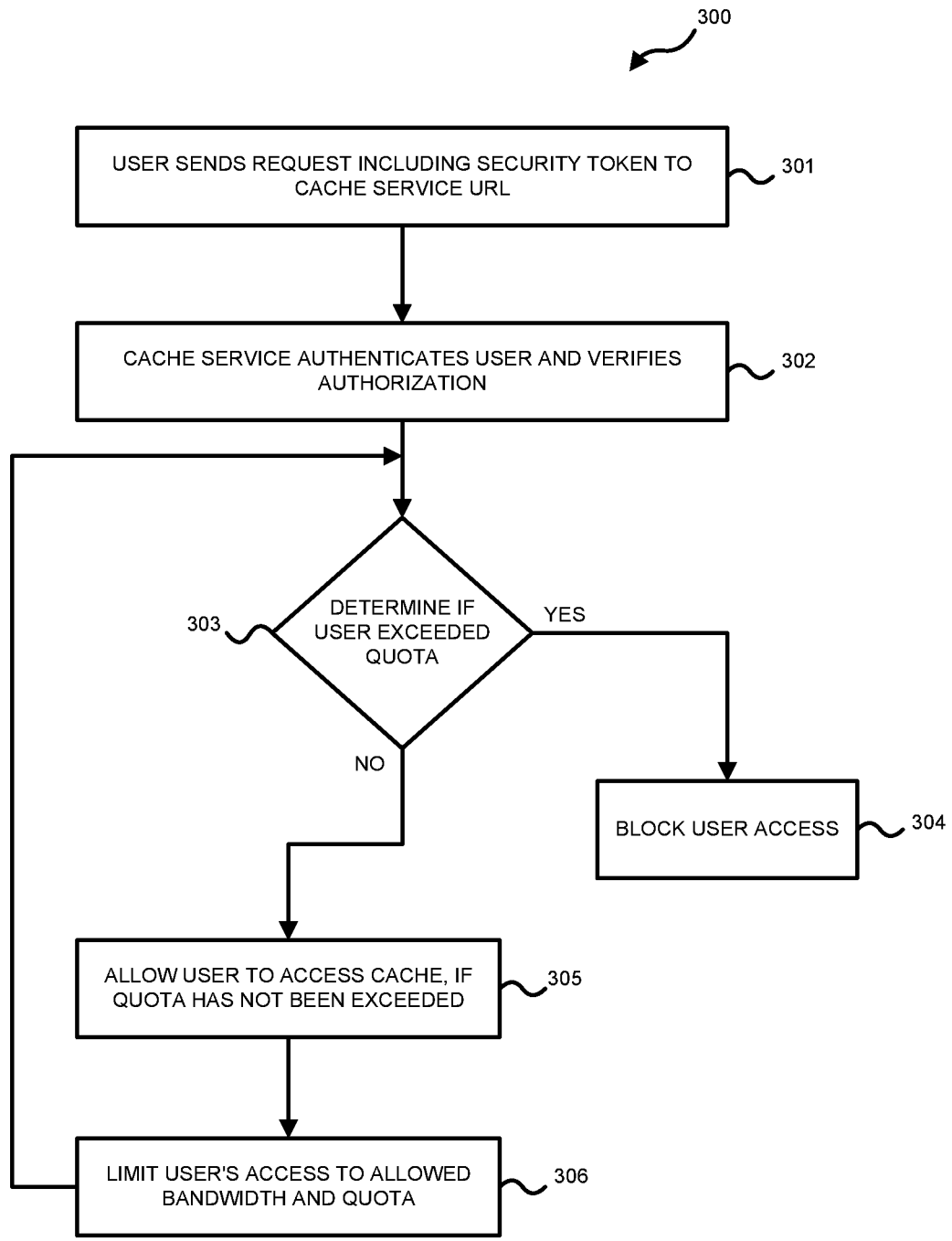
FIG. 3 is a flowchart that illustrates a process for using the cache service.

FIG. 3 is a flowchart 300 that illustrates a process for using the cache service. In step 301, the user sends a request to use the cache to the assigned cache service URL. The request includes a security token or other authentication information. In step 302, the cache service authenticates the user and validates the user token to verify that the user is authorized to use the service.

In step 302, once the user is authenticated and authorized, the cache service determines whether the user has exceeded its quota on the cache service. The user originally registers with the cache service to use a selected cache size. The quota may be defined, for example, as a total cache size, such as an allowed number of megabytes or gigabytes, or as a bandwidth, such as an allowed usage level per hour or day. The user is blocked in step 304 if the user's quota has been exceeded. Otherwise, if the user has not exceeded its quota, then the user is allowed to access the cache in step 305.

In step 306, while the user is accessing the cache, the cache service monitors the user's quota and limits the user's access to the quota and bandwidth that has been assigned to or purchased by the user. The process may periodically return to step 303 to reevaluate the level of use.

In one embodiment, a throttling algorithm may be used to control the user's bandwidth and cache usage. Each user is blocked from accessing other tenant's content, and each user's content is protected from access by other tenant's. Additionally, the throttling algorithm and usage limits ensure that each tenant is provided their contracted quota and bandwidth. In this way, one tenant cannot overuse the system to the detriment of the other users.

Figure 4:
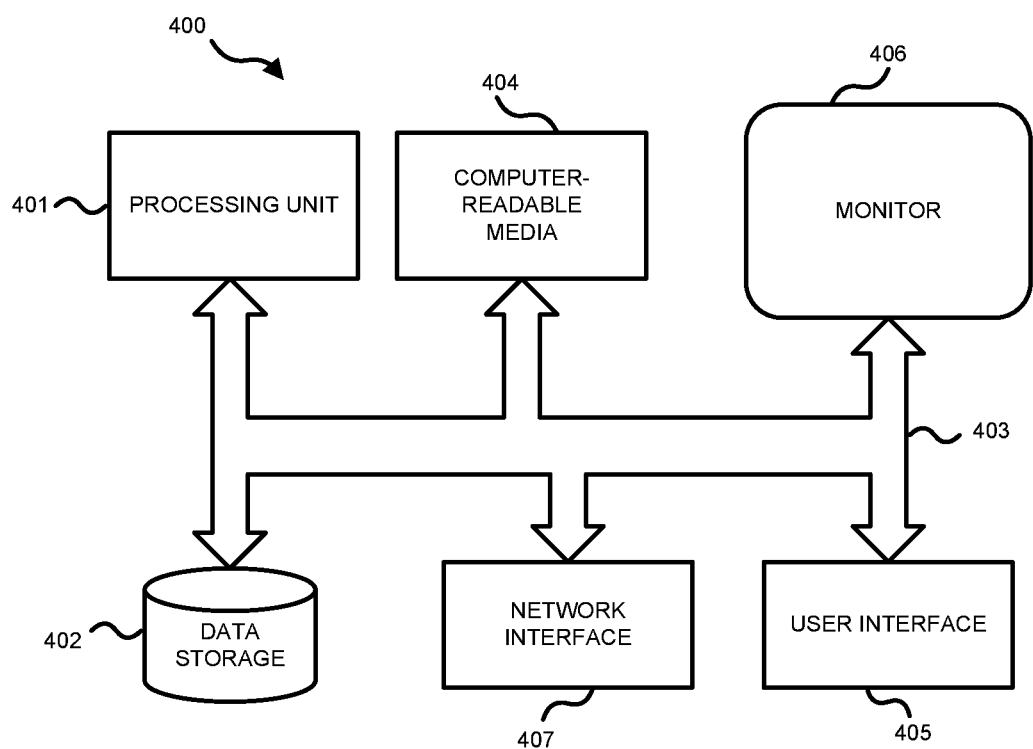
FIG. 4 illustrates an example of a suitable computing and networking environment on which the components and processes of FIGS. 1-3 may be implemented.

FIG. 4 illustrates an example of a suitable computing and networking environment 400 on which the components and processes of FIGS. 1-3 may be implemented. For example, client application 101, user interface 102, network load balancer 104, gateway node 105, and/or cache server 106 may be embodied in a system such as system 400. The computing system environment 400 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

It will be understood that steps 201-205 of the process illustrated in FIG. 2 and steps 301-306 of the process illustrated in FIG. 3 may be executed simultaneously and/or sequentially. It will be further understood that each step may be performed in any order and may be performed once or repetitiously.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 400. Components may include, but are not limited to, processing unit 401, data storage 402, such as a system memory, and system bus 403 that couples various system components including the data storage 402 to the processing unit 401. The system bus 403 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 typically includes a variety of computer-readable media 404. Computer-readable media 404 may be any available media that can be accessed by the computer 401 and includes both volatile and nonvolatile media, and removable and non-removable media. By way of example, and not limitation, computer-readable media 404 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The data storage or system memory 402 includes computer storage media in the form of volatile and/or nonvolatile memory such as read only memory (ROM) and random access memory (RAM). A basic input/output system (BIOS), containing the basic routines that help to transfer information between elements within computer 400, such as during start-up, is typically stored in ROM. RAM typically contains data and/or program modules that are immediately accessible to and/or presently being operated on by processing unit 401. By way of example, and not limitation, data storage 402 holds an operating system, application programs, and other program modules and program data.

Data storage 402 may also include other removable/non-removable, volatile/nonvolatile computer storage media. By way of example only, data storage 402 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 405 or other input devices such as a tablet, electronic digitizer, a microphone, keyboard, and/or pointing device, commonly referred to as mouse, trackball or touch pad. Other input devices may include a joystick, game pad, satellite dish, scanner, or the like. These and other input devices are often connected to the processing unit 401 through a user input interface 405 that is coupled to the system bus 403, but may be connected by other interface and bus structures, such as a parallel port, game port or a universal serial bus (USB). A monitor 406 or other type of display device is also connected to the system bus 403 via an interface, such as a video interface. The monitor 406 may also be integrated with a touch-screen panel or the like. Note that the monitor and/or touch screen panel can be physically coupled to a housing in which the computing device 400 is incorporated, such as in a tablet-type personal computer. In addition, computers such as the computing device 400 may also include other peripheral output devices such as speakers and printer, which may be connected through an output peripheral interface or the like.

The computer 400 may operate in a networked environment using logical connections 407 to one or more remote computers, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a LAN networking environment, the computer 400 may be connected to a LAN through a network interface or adapter 407. When used in a WAN networking environment, the computer 400 typically includes a modem or other means for establishing communications over the WAN, such as the Internet. The modem, which may be internal or external, may be connected to the system bus 403 via the network interface 407 or other appropriate mechanism. A wireless networking component such as comprising an interface and antenna may be coupled through a suitable device such as an access point or peer computer to a WAN or LAN. In a networked environment, program modules depicted relative to the computer 400, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for provisioning a multi-tenant cache server, comprising:
   receiving, at a computer system, a request to create a new multi-tenant cache on a cloud computing system for an application, the cloud computing system comprising a cache cluster to host the new multi-tenant cache, wherein the cache cluster comprises a plurality of front-end gateway server nodes and a plurality of back-end cache servers;
   provisioning an access control endpoint associated with a reserved space on one or more back-end cache servers from the plurality of back-end cache servers;
   providing a shared key and the access control endpoint to a client device;
   providing a private version of the shared key to a front-end gateway server node from the plurality of front-end gateway server nodes; and
   in response to the application passing the shared key as an input and based on the front-end gateway server node having the private version of the shared key thereon, granting access to the reserved space via the front-end gateway server node.

2. The method of claim 1, wherein granting access to the reserved space comprises:
   returning a ticket to the client device for caching on the client device; and
   granting access to the reserved space based on validation of the ticket received from the client device.

3. The method of claim 2, wherein the ticket is associated with an expiration period during which the client device can access the reserved space by providing the ticket to the front-end gateway server node.

4. The method of claim 3, further comprising:
   receiving, from the client device, a request to access the reserved space, the request comprising the ticket cached on the client device; and
   in response to determining that the expiration period has elapsed, providing, to the client device, a rejection of the request to access the reserved space.

5. The method of claim 2, wherein the front-end gateway server node uses the private version of the shared key to decrypt user data to authenticate the client device prior to granting access to the reserved space.

6. The method of claim 1, wherein the plurality of back-end cache servers comprises a ring network of server devices, wherein the plurality of front-end gateway server nodes track location of data within the ring of network server devices.

7. The method of claim 1, further comprising identifying the cache cluster to host the new multi-tenant cache based on a requested cache size included within the request to create the new multi-tenant cache.

8. The method of claim 1, further comprising partitioning data of the reserved space across multiple back-end cache servers of the plurality of back-end cache servers such that each tenant associated with the new multi-tenant cache is assigned a uniquely named cache, wherein partitioning data of the reserved space comprises assigning multiple domain names to a common virtual internet protocol (VIP).

9. The method of claim 1, wherein the front-end gateway server node is coupled to the plurality of back-end cache servers within the cache cluster to minimize a number of hops between the client device and the reserved space.

10. The method of claim 1, wherein the front-end gateway server node is a first front-end gateway server node from multiple front-end gateway server nodes each having routing information stored thereon indicating a location of the reserved space on the one or more back-end cache servers.

11. The method of claim 1, wherein the front-end gateway server node is configured to update the routing information in an event that the one or more back-end cache servers go down and causing user data from the reserved space to be moved to a second one or more back-end cache servers from the plurality of back-end cache servers.

12. The method of claim 1, wherein granting access to the reserved space includes the front-end gateway server node retrieving data from the reserved space and relaying the data to the client device.

13. A system comprising:
   at least one processor; and
   a non-transitory computer readable medium storing instructions thereon that, when executed by the at least one processor, cause the system to:
      receive a request to create a new multi-tenant cache on a cloud computing system for an application, the cloud computing system comprising a cache cluster to host the new multi-tenant cache, wherein the cache cluster comprises a plurality of front-end gateway server nodes and a plurality of back-end cache servers;
      provision an access control endpoint associated with a reserved space on one or more back-end cache servers from the plurality of back-end cache servers;
      provide a shared key and the access control endpoint to a client device;
      provide a private version of the shared key to a front-end gateway server node from the plurality of front-end gateway server nodes; and
      in response to the application passing the shared key as an input and based on the front-end gateway server nodes having a private version of the shared key thereon, grant access to the reserved space via the front-end gateway server node.

14. The system of claim 13, wherein granting access to the reserved space comprises:
   returning a ticket to the client device for caching on the client device; and
   granting access to the reserved space based on validation of the ticket received from the client device.

15. The system of claim 14, wherein the ticket is associated with an expiration period during which the client device can access the reserved space by providing the ticket to the front-end gateway server node, and further comprising instructions that, when executed by the at least one processor, cause the system to:
   receive, from the client device, a request to access the reserved space, the request comprising the ticket cached on the client device; and
   in response to determining that the expiration period has elapsed, provide, to the client device, a rejection of the request to access the reserved space.

16. The system of claim 14, wherein the front-end gateway node uses the private version of the shared key to decrypt user data to authenticate the client device prior to granting access to the reserved space.

17. The system of claim 13, further comprising instructions that, when executed by the at least one processor, cause the system to:
identify the cache cluster to host the new multi-tenant cache based on a requested cache size included within the request to create the new multi-tenant cache; and
partition data of the reserved space such that each tenant associated with the new multi-tenant cache is assigned a uniquely named cache, wherein partitioning data of the reserved space comprises assigning multiple domain names to a common virtual internet protocol (VIP).

18. A non-transitory computer readable medium comprising instructions thereon that, when executed by at least one processor, cause a computer system to:
receive a request to create a new multi-tenant cache on a cloud computing system for an application, the cloud computing system comprising a cache cluster to host the new multi-tenant cache, wherein the cache cluster comprises a plurality of front-end gateway server nodes and a plurality of back-end cache servers;
provision an access control endpoint associated with a reserved space on one or more back-end cache servers from the plurality of back-end cache servers;
provide a shared key and the access control endpoint to a client device;
provide a private version of the shared key to a front-end gateway server node from the plurality of front-end gateway server nodes, the front-end gateway server nodes being coupled to the one or more back-end cache servers; and
in response to the application passing the shared key as an input and based on the front-end gateway server nodes having a private version of the shared key thereon, grant access to the reserved space via the front-end gateway server node.

19. The non-transitory computer readable medium of claim 18, wherein granting access to the reserved space comprises:
returning a ticket to the client device for caching on the client device; and
granting access to the reserved space based on validation of the ticket received from the client device.

20. The non-transitory computer readable medium of claim 19, wherein the ticket is associated with an expiration period during which the client device can access the reserved space by providing the ticket to the front-end gateway server node, and further comprising instructions that, when executed by the at least one processor, cause the system to:
receive, from the client device, a request to access the reserved space, the request comprising the ticket cached on the client device; and
in response to determining that the expiration period has elapsed, provide, to the client device, a rejection of the request to access the reserved space.

* * * * *